March 1, 1960
G. D. STUEWER
2,926,802
METHOD AND APPARATUS FOR TRANSFERRING GRANULAR SOLIDS
Filed June 1, 1954
2 Sheets-Sheet 1
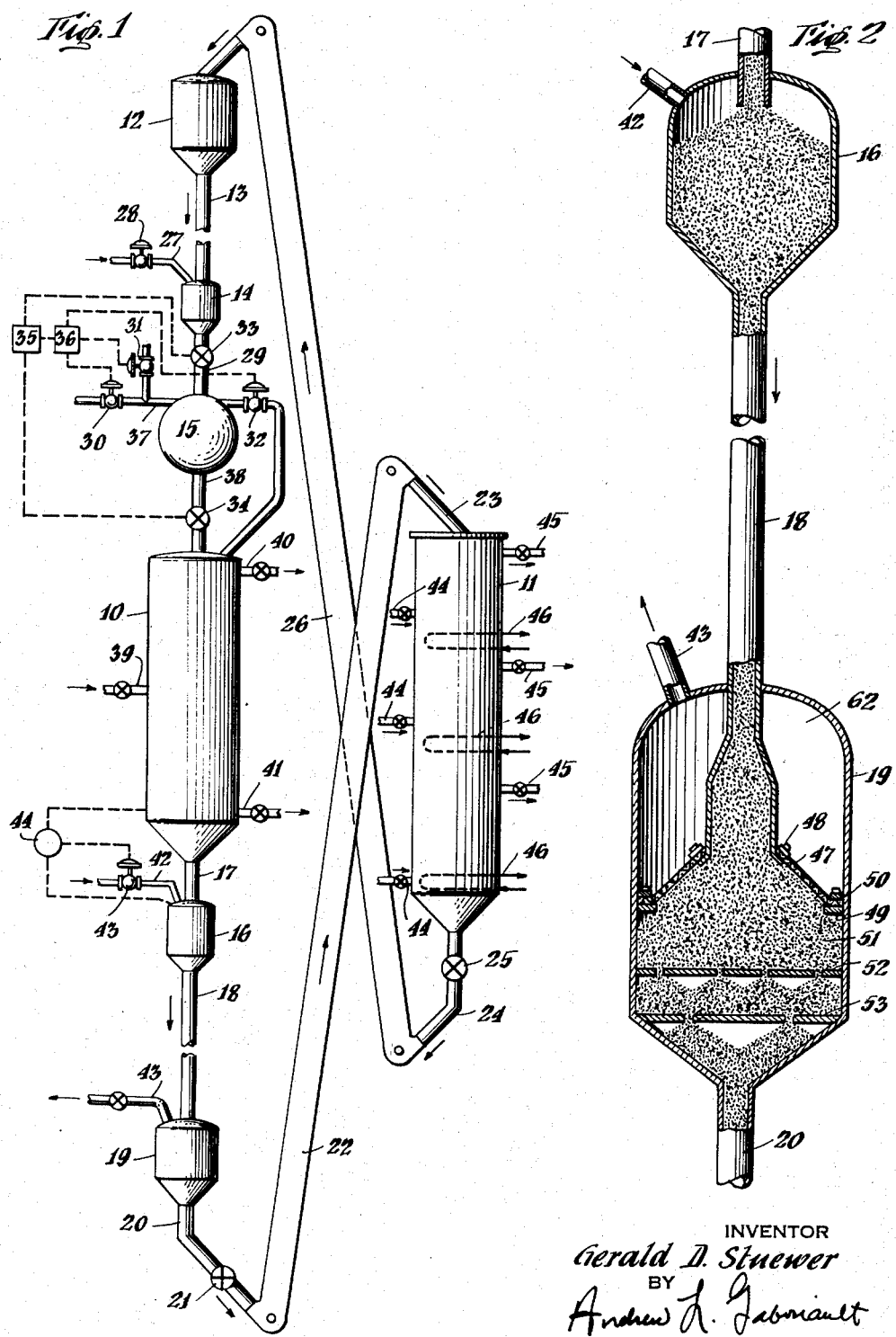
INVENTOR
Gerald D. Stuewer
BY
Andrew L. Gabriault
AGENT

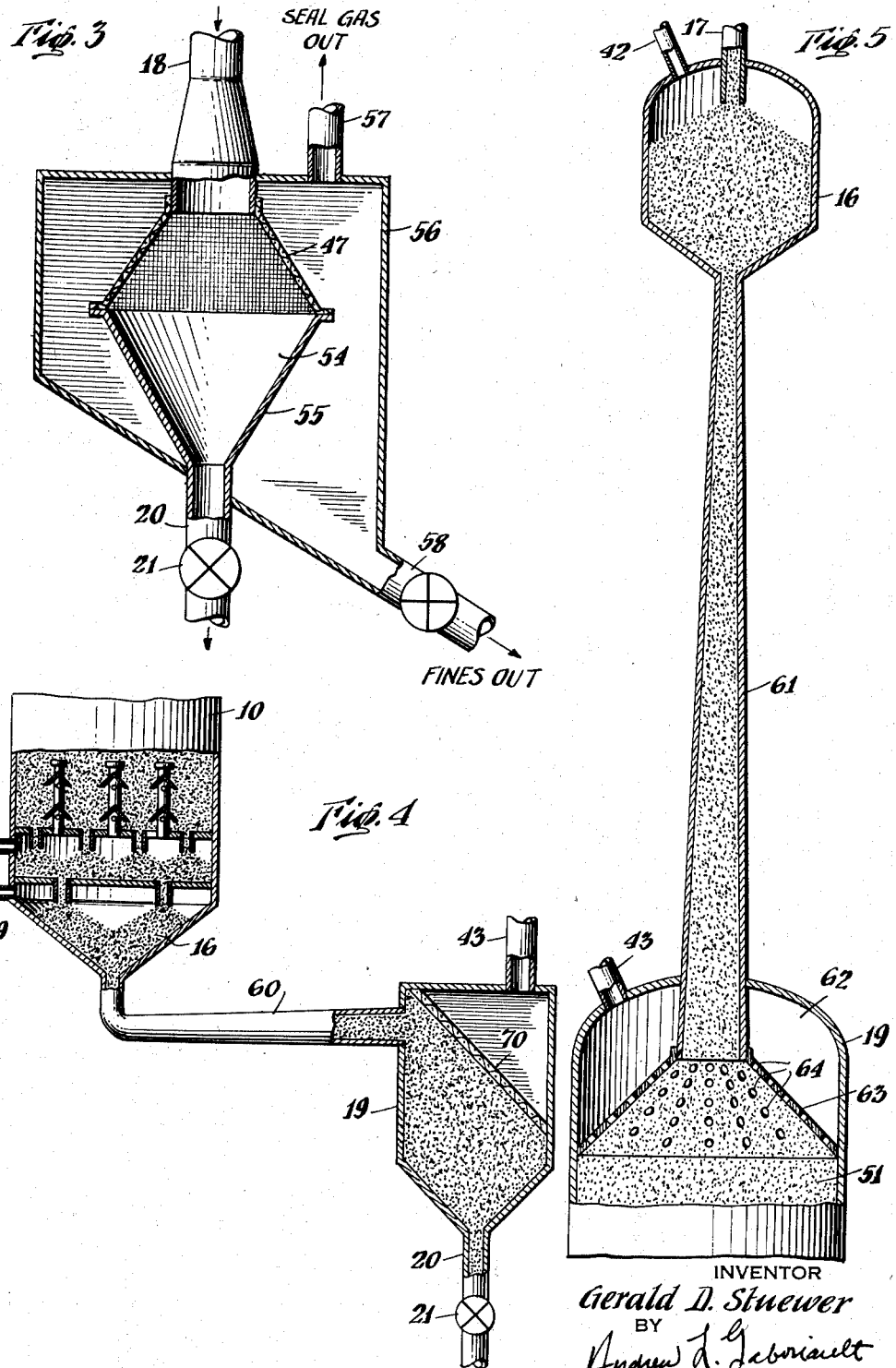

United States Patent Office

2,926,802
Patented Mar. 1, 1960

2,926,802

METHOD AND APPARATUS FOR TRANSFERRING GRANULAR SOLIDS

Gerald D. Stuewer, Mantua, N.J., assignor to Socony Mobil Oil Company, Inc., a corporation of New York Application June 1, 1954, Serial No. 433,640

6 Claims. (Cl. 214—152)

This invention deals with a method and apparatus for transferring granular solids from a high pressure zone or chamber to a substantially lower pressure zone or chamber and is particularly concerned with a transfer system which will constantly maintain the required pressure in each zone.

Typical of the processes to which this invention may be applied is the continuous catalytic reforming of gaseous hydrocarbons wherein the hydrocarbons are contacted with a compact moving mass of granular solid catalytic contact material in a confined reaction zone to effect the conversion of the hydrocarbons to products which contain substantially higher percentages of gasoline, and the used contact material is then passed to a separate regeneration zone to effect removal of contaminants deposited thereon in the reaction zone. Other exemplary processes include the catalytic cracking, aromatization, desulfurization, and the like, of fluid hydrocarbons in the presence of a granular catalyst and the thermal cracking, visbreaking, reforming, and the like, of fluid hydrocarbons in the presence of a granular inert solid.

Granular solids suitable for processes of these types which are catalytic in nature include natural or treated clays, bauxite, activated alumina or synthetic associations of silica, alumina or magnesia, or combinations thereof, to which certain metallic oxides or sulfides may be added in small amounts for specific purposes. Granular solids which are inert in character include refractory materials, such as zirkite, corhart or mullite, and stones or metallic particles or balls.

Granular solids suitable for use in this invention should be of palpable particulate form as distinglished from finely divided powders, and may be of regular shape, such as pellets, tablets, spheres and the like, or of irregular shape, such as is obtained in grinding and screening operations. Generally, the granular solids should fall within the size range 1 inch to 100 mesh and preferably 4 to 15 mesh by Tyler Standard Screen Analysis.

In processes of the aforementioned types, as well as many others, it is frequently desirable to conduct the conversion reaction at a substantially higher pressure than the regeneration, so that a problem occurs as to a suitable method for transferring the granular solids from the high pressure reaction zone to the lower pressure regeneration zone while maintaining constantly the desired pressure in each. Where the pressure differential between the two zones is low, for example, less than 30 pounds per square inch, a very satisfactory system known to the prior art is to provide an elongated leg or column of granular solids which extends from the high pressure reaction zone to a lower pressure disengaging zone which is maintained at about the pressure of the regeneration zone. Normally, seal gas is supplied to the leg adjacent its upper end and flows downwardly through the leg. The leg or column is of restricted cross-section compared to the reaction and disengaging zones, so that a bed of granular solids with open upper surface is formed in the disengaging zone, through which upper surface seal gas may escape to be removed from the system. This upper surface is in the shape of a cone with apex at the low pressure end of the depressuring leg and sides at the angle of repose of the granular solids. This angle of repose varies with the particular solid but is normally within the range 25 to 45 degrees and usually is about 30 degrees. This transfer and depressuring system is desirable because it is inexpensive and simple to operate. However, it was found that when the pressure differential between the reaction and regeneration zones is increased, as is desirable for some conversion processes such as catalytic reforming, this system did not operate entirely satisfactorily. It was found that with increasing pressure drop per foot in the depressuring leg, there was a tendency for the leg to suddenly "blow out," that is, empty itself of granular solids with explosive violence. The "blow out" results in loss of pressure in the reactor and possible fire hazard from escaping reactants. This "blow out" phenomenon has been noted to occur particularly where the average pressure gradient through the depressuring leg, due to gas flow, is in excess of 1 pound per square inch per foot.

It has been found that the "blow out" of the leg is accompanied, in the conventional system, by a rapid rise in the upper surface of the granular solids bed at the lower end of the leg to a level of possibly several inches above the lower end of the depressuring leg conduit. At this stage the bed presents a level surface rather than its usual inclined surface. The "blow out" probably begins with a slight upward movement of the surface of the bed in the disengager at the low pressure end of the leg which instantaneously increases the granular solids flow through the leg. Normally, because of the restricted size of the leg, there is an orifice effect at its high pressure end so that any sudden increase in granular solids flow may result in an instantaneous pulling away of the granular solids at the high pressure end of the leg from the accumulation of granular solids above it, so as to void a few inches in the upper end of the leg. This shortens the effective depressuring leg and increases gas flow and the pressure drop per foot across the leg which, in turn, causes a further upward movement of the bed below the leg and the entire process would mushroom to empty the leg.

A major object of this invention is to provide, in a system for transferring granular solids from a high pressure zone to a lower pressure zone, a method and apparatus for overcoming the above-described difficulty.

Another object of this invention is to provide a method and apparatus for safely and efficiently transferring granular solids from a high pressure zone to a lower pressure zone.

These and other objects will be apparent from the following discussion of the invention.

This invention provides an improvement in method and apparatus for transferring granular solids from a high pressure zone to a lower pressure zone, wherein the granular solids are passed from the high pressure zone to the lower pressure zone as a substantially compact column of restricted cross-section compared to the two zones. A substantially compact bed is maintained in the lower pressure zone to which the granular solids column delivers. The upper surface of this bed is confined so as to prevent upward movement of granular solids particles desired to be retained in the system while permitting gas to escape upwardly out of the bed. This gas is withdrawn from the lower pressure zone and granular solids are withdrawn from the lower section of the bed at a rate controlled to maintain the granular solids in the transfer system in compacted condition.

This invention will be best understood by referring to the attached drawings, of which Figure 1 is an elevational view showing a typical hydrocarbon reforming process to which this invention may be applied;

Figure 2 is an elevational view, partially in section, showing the one form of the apparatus of this invention;

Figure 3 is an elevational view, partially in section, showing a modified form of depressuring chamber for use in this invention;

Figure 4 is an elevational view, partially in section, showing a further modified form of this invention; and Figure 5 is an elevational view, partially in section, showing a still further modified form of this invention.

All of these drawings are diagrammatic in form and like parts in all bear like numerals.

Turning first to Figure 1, there is shown therein a reaction vessel 10 and a regeneration vessel 11 positioned side by side. A surge hopper 12 is situated above vessel 10. Extending downwardly from the lower end of hopper 12 is a seal leg 13 which connects into a seal chamber 14 and beneath chamber 14 is a spherical pressuring vessel 15. Beneath vessel 10 is a seal chamber 16 which is connected to the lower end of vessel 10 by means of a conduit 17. Extending downwardly from the bottom of vessel 16 is a depressuring leg 18 in the form of a conduit of restricted cross-section compared to the cross-section of vessel 16. Conduit 18 connects into the upper end of a disengaging chamber 19. Conduit 20, with valve 21 thereon, extends from the bottom of chamber 19 into the lower end of a conveyor 22 and a conduit 23 connects the upper section of conveyor 22 with regenerator 11. Conduit 24, with valve 25 thereon, extends from the lower section of regenerator 11 into the lower section of a second conveyor 26.

In operation, fresh granular solid catalytic contact material, under a pressure near atmospheric, gravitates from surge hopper 12 downwardly through seal leg 13 as a compact stream into seal chamber 14. Inert seal gas, such as steam or flue gas, is supplied to chamber 14 through conduit 27 at a rate controlled by diaphragm valve 28 to maintain a pressure within chamber 14 slightly above the pressure in the hopper 12. Granular solids are then supplied to pressuring chamber 15 on a cyclic basis through conduit 29. A pressuring cycle may be considered to begin with chamber 15 empty of granular solids and at atmospheric pressure, and valves 30, 31, 32, 33 and 34 closed. All of these valves are operated during the cycle by controllers 35 and 36. First, valve 33 is opened and the chamber 15 filled with granular solids. Valve 33 is then closed and valve 30 opened to admit a pressuring gas, such as steam or hydrocarbon vapor, to vessel 15 through conduit 37. The pressure in vessel 15 is increased by means of this gas to a pressure near the pressure in reactor 10, for example, about 175 pounds per square inch. Valve 30 is then closed and valve 32 opened to adjust the pressure within chamber 15 to the pressure within the upper section of reactor 10. Valve 34 is then opened and granular solids flow from chamber 15 through conduit 38 into the upper section of reactor 10. Valves 32 and 34 are then closed and valve 31 is opened to exhaust chamber 15 to the atmosphere. Valve 31 is then closed and a new cycle begins.

Granular solids flow through the reaction zone within vessel 10 as a downwardly gravitating, substantially compact bed. Fluid hydrocarbon charge, such as petroleum naphtha, is admitted to the reaction zone through conduit 39. A portion of the charge passes upwardly through the granular solids bed while the remainder passes downwardly therethrough. Gaseous products are withdrawn from the upper and lower ends of the reactor through conduits 40 and 41. Spent granular solids bearing a carbonaceous contaminant deposit pass from the lower section of the reaction zone into seal zone 16 through conduit 17. Seal zone 16 is maintained at a pressure slightly in excess of the pressure in the lower section of reactor 10 by admitting seal gas through conduit 42 at a rate controlled by diaphragm valve 43 in response to differential pressure controller 44. Where reactor 10 is operated under pressure of about 175 pounds per square inch, a pressure of 175.5 pounds per square inch will be suitable for chamber 16. Granular solids admixed with seal gas pass downwardly through depressuring leg 18 into disengaging chamber 19, which is maintained at a pressure adjacent the pressure in regenerator 11, for example, atmospheric pressure, by removing gas through conduit 43. Granular solids are removed from the lower end of the disengaging zone at a rate controlled by valve 21 to maintain the stream of granular solids flowing in conduit 18 in compacted condition. The spent granular solids are then passed to the upper section of regenerator 11 by means of conveyor 22 and conduit 23. Spent granular solids flow through the regeneration zone within vessel 11 as a downwardly gravitating, substantially compact column. A combustion supporting gas, such as air, is supplied to this column at a plurality of levels by means of passages 44. Flue gas is withdrawn through passages 45. The contact material column is cooled at a plurality of levels by circulating a suitable cooling fluid through cooling coils 46 so as to avoid damaging the granular solids due to overheating. Granular solids are removed from the lower section of vessel 11 at a rate controlled by valve 25 and elevated by conveyor 26 to supply hopper 12. Conveyors 22 and 26 may be any of the forms suitable for transporting hot granular solids, such as bucket elevators or pneumatic lifts.

The system for transferring and depressuring the granular solids stream removed from the reaction zone is shown in Figure 2, where high pressure seal zone 16 is shown positioned above lower pressure disengaging zone 19. Seal leg 18 extends from the bottom of seal chamber 16 substantially vertically downwardly to an intermediate level within chamber 19. The lower end of conduit 18 is of enlarged cross-section. Extending outwardly from the lower end of conduit 18 is a foraminous partition or hood 47 which takes the form, in Figure 2, of a frusto-conical shaped screen. Screen 47 is bolted to the lower end of conduit 18 by bolts 48, while the lower end of screen 47 is bolted to a support 49 extending from the walls of chamber 19 by means of bolts 50. The sides of screen 47 make an angle with the horizontal greater than the angle of repose of the granular solids.

In operation, spent granular solids pass into seal zone 16 from the reaction zone through conduits 17. As previously stated, seal zone 16 is maintained at a high pressure slightly in excess of that within the reaction zone by the admission of seal gas through conduit 42. Granular solids, admixed with seal gas, gravitate downwardly as a compact column or stream through conduit 18 and onto a restricted area of the surface of a compact bed of granular solids 51 maintained within disengaging zone 19 below screen 47. The solid surfaces of screen 47, which slope downwardly and outwardly from the area of supply of granular solids, act to confine the upper surface of bed 51 at angles with the horizontal greater than the angle of repose of the granular solids. The size of the openings in screen 47 is less than the smallest size particle of granular solids that is desired to be retained in the cyclic stream so that screen 47 is pervious to gas flow but impervious to the desirable sizes of granular solids. Thus, it is not possible for the upper surface of bed 51 to rise or change its angle of repose and therefore "blow out" of the leg 18 is prevented, because there is no volume into which granular solids from the leg could be forced. The gas which enters with the screen from conduit 18 passes upwardly into a plenum space 62 in the upper section of the disengaging zone above screen 47. Gas is then removed through passage 43 at a rate sufficient to maintain the pressure within chamber 19 at the desired low pressure, such as a pressure adjacent to the pressure in the regeneration zone 11. Granular solids are withdrawn from the lower section of bed 51 by means of conduit 20 at a throttled rate. Baffles 52 and 53 are positioned within the lower section of chamber 19 to insure uniform withdrawal of granular solids across the entire cross-section of bed 51. The lower end of conduit 18 is enlarged so as to prevent possible boiling of the granular solids stream at this point as the stream exits from conduit 18, since it has been found that with depressuring legs of uniform cross-section, there is a large pressure drop in the last foot or so of the depressuring leg.

A modified arrangement for the lower end of the transfer system is shown in Figure 3. Connected to the lower end of depressuring leg conduit 18 is a frusto-conical shaped screen 47, which forms the upper section of disengaging chamber 54. The lower section is formed by a funnel-shaped member 55, with conduit 20 extending from the bottom thereof. Screen 47 is welded to the lower end of conduit 18 at its upper end and to the upper end of member 55 on its lower end. All around disengaging chamber 54 is separation chamber 56 having gas removal conduit 57 extending from its upper end and granular solids fines removal conduit 58 extending from its lower end.

The system of Figure 3 may be operated not only to transfer and depressure the granular solids but also to remove undesirable granular solids fines from the system. These fines continuously are formed in any flowing compact mass system due to attrition, and are undesirable because they tend to accumulate and plug restricted areas in the compact beds in the reactor and regenerator, thereby causing channeling of gas flow through the beds. This is particularly serious in the regenerator where permanent damage of the granular solids, due to overheating, may readily be caused by this channeling.

In operating the apparatus of Figure 3, granular solids, admixed with seal gas, gravitate from a high pressure zone (not shown) as a compact stream into disengaging zone 54 through conduit 18. The granular solids from conduit 18 expand outwardly beneath screen 47 to supply a compact bed of granular solids maintained within zone 54. The upper surface of this bed is confined at angles with the horizontal greater than the angle of repose of the granular solids by means of the downwardly and outwardly diverging sides of screen 47. The openings in screen 47 are smaller than the smallest size particle of granular solids desired to be retained in the system but larger than the size of the fines. Gas passes through screen 47 into separation zone 56, carrying entrained fines with it from disengaging zone 54. The gas pressure also forces fines through screen 47 which roll downwardly over the screen. In the larger separation zone the gas velocity is reduced and fines drop out of the gas stream. Substantially all the fines, except dust, which pass through screen 47 drop to the bottom of zone 56 to be withdrawn through passage 58 and discarded from the system. Gas is withdrawn through passage 57 to maintain the desired low pressure in zones 54 and 56.

In many conversion systems a major design factor is the height of the conversion apparatus. After a certain minimum height is exceeded each additional foot of height results in a large outlay for structural steel to support the apparatus. Therefore, it is highly desirable, from an economy standpoint, to minimize the conversion unit height wherever possible. One system for providing the long depressuring leg desired where the reaction and regeneration zones are at widely different pressures without making it necessary to add markedly to the height of the conversion apparatus is shown in Figure 4. Extending from the lower end of reaction vessel 10 is depressuring leg 60, a major portion of which lies in a horizontal plane. Depressuring legs of this type, through which contact material will not flow under the influence of gravity alone, are the subject of claims in U.S. patent application, Serial Number 519,216, filed June 30, 1955, now Patent No. 2,889,271. Seal gas is supplied to the lower section of reactor 10 through conduit 59 at a pressure slightly above the pressure in the main body of reactor 10. Granular solids, admixed with seal gas, pass outwardly from vessel 10 and flow as a compact stream through passage 60 into disengaging vessel 19. Across vessel 19 extends a flat screen 70 inclined at an angle with the horizontal greater than the angle of repose of the contact material and having openings smaller than the contact material particles. The operation of this disengager is similar to that of the disengagers previously described.

In order for granular solids in the horizontal portion of depressuring leg 60 to flow as a compact stream with the size of particles generally used in commercial operation, the pressure gradient in the conduit 60 should be at least 1 pound per square inch per foot. Besides having a major portion of its length horizontal, depressuring leg 60 is of gradually increasing cross-section as it extends from the high pressure reactor to the low pressure disengaging chamber. This tapering of the leg should be such that the pressure drop per foot over the entire length of the leg is constant rather than varying as it does when the leg is straight. Therefore, shorter depressuring legs may be used when they are tapered rather than straight. Tapered depressuring legs are described and claimed in U.S. patent application, Serial Number 329,882, filed January 6, 1953, now Patent No. 2,829,087.

Figure 5 illustrates a further modification of this invention. Seal zone 16 and disengaging zone 19 are similar in design and operation to those of Figure 2. In Figure 5, however, the depressuring leg that extends between them is in the form of a substantially vertical tapered conduit 61 with gradually increasing cross-section as it extends from zone 16 to zone 19. This makes possible a shorter leg as previously mentioned. Also, in Figure 5, the confining hood on bed 51 is in the form of a solid frusto-conical shaped plate 63 with a plurality of perforations 64 therethrough.

The various components of the improved method and apparatus of this invention may take many other forms than those shown and described above. The confining hood 47 or 63, while shown herein as circular in horizontal cross-sectional shape, may take any other desired shape, such as rectangular, hexagonal or other regular shape, or may be of irregular shape. This hood may be made of a woven wire screen, a bar screen, a perforated plate, and the like. The openings therein should be of a size small enough to confine the particles of granular solids desired to be retained in the system but large enough and numerous enough so as not to impose a substantial pressure drop upon the gas flowing therethrough. Where a woven wire screen is used, a screen of one mesh size Tyler smaller than the smallest particles desired to be utilized in the system, will meet these requirements.

This invention is not limited to use with hydrocarbon conversion systems but may be used in any system where granular solids must be transferred from a high pressure zone to a low pressure zone. The invention is broadly applicable where there exists any pressure differential between the two zones, but it is principally applicable where the pressure differential between the two zones is in excess of 40 pounds per square inch and above 1 pound per square inch per foot in the depressuring leg, and particularly to systems where the differential between zones is in excess of 100 pounds per square inch and over 1.5 pounds per square inch per foot in the depressuring leg. In the broader forms of this invention, hood or partition 47 may extend horizontally across the disengaging zone at the level of the lower end of the depressuring leg 18, or even at a level above the lower end of the depressuring leg. The disengager might then be filled by supplying contact material through the screen or by contact material which has passed through the seal leg. However, generally the hood should have sides at angles with the horizontal greater than the angle of repose of the granular solids, preferably at least 5 degrees greater than the angle of repose. The angle of repose varies, as previously stated, with the particular granular solids used and generally falls within the range 25 to 45 degrees with the horizontal. For most commerically used granular solids the angle of repose is about 30 degrees so that the confining hood should be at least 35 degrees.

The design of substantially vertical depressuring legs is best made by studying data on the attrition of granular solids under the pressure differential of the system when different lengths of leg are used and the granular solids velocity is at a low constant figure for each leg. Attrition will decrease with increasing leg length because gas velocity and pressure gradient decrease. The shortest leg which gives a reasonable attrition figure and seal gas requirement is selected. Then, using the chosen length, the effect of granular solids velocity on attrition is studied. It will be found here that attrition rises sharply at one particular velocity. For example, the following data are representative for a 100 foot depressuring leg using a granular reforming catalyst:

| Catalyst Velocity, Feet per second | Attrition Rate, Tons of fines per day per 100 tons of catalyst circulated per hour |
|---|---|
| 1 | 0.2 |
| 2½ | 0.3 |
| 4 | 0.8 |

Consequently, for this particular situation, a leg which has a cross-sectional area so as to give a catalyst velocity of 2½ feet per second or under, would be desirable. Since a high velocity means a small cross-sectional area, the diameter of leg which gives the highest possible granular solids velocity through the leg consistent with a low attrition rate will be chosen to minimize seal gas consumption. For design of horizontal depressuring legs, U. S. patent application, Serial Number 519,216, filed June 30, 1955, should be consulted.

Following are three examples of transfer systems designed and operated according to this invention:

*Example I*

A 20 foot vertical tapered seal leg was used having a minimum diameter of 3.068 inches at its upper end and a maximum diameter of 6.065 inches at its lower end. On the lower end of the leg was an enlarged section of 10 inches diameter. Attached to the lower end of this 10 inch section, within a disengager of 24 inches diameter, was a conical screen of 16 mesh Tyler size and having sides at about a 45 degree angle. This leg was operated with bead catalyst of size within the range about 4 to 5 mesh Tyler and at pressure drops thereacross up to 175 pounds per square inch and catalyst rates up to 3.0 feet per second without "blow out." All attempts to operate without the screen were unsuccessful, the leg continuously blowing out.

*Example II*

The apparatus described in Example I was used with the 20 foot tapered leg being replaced by a 20 foot length of 3 inch, schedule 40 straight pipe. This, too, operated successfully with the screen in place at pressure drops up to 175 pounds per square inch across the leg, but "blow out" occurred without the screen.

*Example III*

A setup similar to that shown in Figure 4 was used with a 20 foot tapered leg extending horizontally into the side of a disengaging vessel. The leg was tapered to the same extent as that of Example I. A 24 inch diameter disengager, 24 inches high, having a flat 16 mesh screen extending thereacross at a 45 degree angle, was used and the entire unit operated successfully with 4 to 15 mesh bead catalyst at total pressure drops up to 175 pounds per square inch and catalyst rates up to 6.5 feet per second.

It is intended to cover herein all changes and modifications of the examples of the invention which do not constitute departures from the spirit and scope of the invention.

I claim:

1. In a method for transferring granular solids from a high pressure zone to a relatively lower pressure zone wherein solids flow from the high pressure zone to the low pressure zone as a substantially compact column of restricted cross-section compared to that of both zones, the improvement which comprises: maintaining a substantially compact bed of granular solids in the lower pressure zone, delivering the solids from the column to the bed, passing gas from said high pressure zone to said lower pressure zone through said column at a rate such that the average pressure gradient through said column is greater than 1 pound per square inch per foot of column length, confining the bed so as to prevent upward movement of all particles desired to be retained in the system while permitting gas to escape upwardly, withdrawing the gas from the low pressure zone at a level above said bed and withdrawing granular solids from the said bed at a rate controlled to maintain the ganular solids in the transfer system in a compacted condition.

2. A method for continuously transferring granular solids from a high pressure contacting zone to a relatively lower pressure contacting zone, which comprises: passing granular solids from the high pressure zone to a disengaging zone as an elongated substantially compact confined stream of granular solids of restricted cross-section compared to said high pressure zone and said disengaging zone, passing said stream onto the upper surface of a substantially compact bed of granular solids maintained within said disengaging zone, passing gas from said high pressure zone to said disengaging zone through said stream at a rate such that the average pressure gradient through said stream is in excess of 1 pound per square inch per foot of stream length, confining the upper surface of said bed with a foraminous partition pervious to gas but impervious to the smallest size particles to be retained in the flowing system, withdrawing gas from the upper section of said disengaging zone at a level above said bed and maintaining the pressure within the disengaging zone thereby at a pressure near the pressure in said lower pressure zone, withdrawing granular solids from said bed at a rate throttled to maintain said bed and said stream in a compact condition, and passing contact material from said bed into said lower pressure zone.

3. A method for the transfer of granular solids from a high pressure zone to a lower pressure zone, which comprises: maintaining a substantially compact bed of granular solids within the lower pressure zone, passing granular solids admixed with gas as a substantially compact stream from the higher pressure zone onto a restricted area on the upper surface of said bed, said stream gradually increasing in cross-sectional area as it passes from the high pressure zone to the bed so as to provide a uniform pressure drop per unit of length of said stream and said stream being of such length that said gas flows therethrough at a rate which results in a pressure gradient in excess of 1 pound per square inch per foot of stream length, confining the upper surface of said bed by means of solid surfaces which are pervious to gas flow but impervious to the flow of the smallest size particle of granular solids desired to be retained in the system and extend downwardly and outwardly from the area of supply of said stream at angles with the horizontal greater than the angle of repose of the granular solids, whereby the gas entering admixed with said stream will pass upwardly through said solid surfaces, removing gas from said lower pressure zone at a level above said bed, and removing granular solids from the lower section of said bed at a rate controlled to maintain said bed and said stream in compacted condition.

4. A method for continuously transferring granular solids from a high pressure to a lower pressure zone, which comprises: maintaining a substantially compact bed of granular solids within the lower pressure zone, passing granular solids admixed with gas as a substantially compact elongated stream from said high pressure zone to said bed, said stream flowing horizontally over most of its length, the pressure gradient through said stream being at least 1 pound per square inch per foot, confining the upper surface of said bed at angles with the horizontal greater than the angle of repose of the granular solids by means of solid surfaces which extend downwardly and outwardly from the area of supply of said stream and which are pervious to gas but impervious to the smallest size solids particle desired to be retained in the system, removing gas from the lower pressure zone at a level above said bed and removing granular solids from the lower section of said bed at a throttled rate.

5. In a process wherein granular solids are continuously cycled between a high pressure zone and a low pressure zone, the improved method of transferring the granular solids from the high pressure zone to the low pressure zone and effecting removal of granular solids fines from the cyclically flowing granular solids, which comprises: maintaining a compact bed of granular solids within a confined disengaging zone, passing granular solids from the high pressure zone as a confined elongated compact stream into the disengaging zone and onto a restricted area of the upper surface of the bed therein, passing gas from said high pressure zone through said stream into said disengaging zone at a rate which results in a pressure gradient through said stream in excess of 1 pound per square inch per foot of stream length, confining the upper surface of the bed from the area of supply of said stream at angles with the horizontal greater than the angle of repose of the granular solids by means of confining surfaces which are pervious to the flow of gas and granular solids fines but impervious to the smallest size particle desired to be retained in the process, maintaining a confined separation zone around said disengaging zone, passing gas and fines through said confining surfaces from said disengaging zone into said separation zone and separating the fines from the gas in the separation zone, removing gas from the upper section of the separation zone at a rate sufficient to maintain the pressure therein and in the disengaging zone at about the pressure of the lower pressure zone, removing fines from the lower section of the separation zone, removing granular solids from the lower section of the bed in the disengaging zone at a throttled rate, and passing the solids so removed to the lower pressure zone.

6. A process for the continuous transfer of granular solids from a high pressure zone containing a first gaseous material to a low pressure zone at a pressure at least 40 pounds per square inch below said high pressure zone and containing a second gaseous material, without mixing said first and second gaseous materials, which comprises: passing contact material from said high pressure zone to said low pressure zone as a confined, substantially compact stream of less cross-section than either of said zones; supplying a third gaseous material to said high pressure zone adjacent the inlet end of said stream at a pressure slightly higher than the pressure of said first gaseous material in said high pressure zone and passing at least a part of said third gaseous material downwardly through said stream; discharging said stream onto a compact bed of granular solids of greater cross-sectional area than said stream within said low pressure zone, the length of said stream being such that the average pressure gradient through said stream is in excess of 1 pound per square inch per foot of stream length; confining the upper surface of said bed at an angle greater than the angle of repose of the contact material by means of a foraminous partition which is pervious to gas but impervious to the smallest size of granular solids particle which it is desired to retain in the flowing system; passing third gaseous material after discharge from said stream through said foraminous partition and withdrawing third gaseous material from said low pressure zone after it has passed through said partition.

References Cited in the file of this patent

UNITED STATES PATENTS

| | | |
|---|---|---|
| 1,971,716 | Hitchcock | Aug. 28, 1934 |
| 2,448,272 | Payne et al. | Aug. 31, 1948 |
| 2,451,924 | Crowley | Oct. 19, 1948 |
| 2,505,194 | Loss | Apr. 25, 1950 |
| 2,529,583 | Adams | Nov. 14, 1950 |
| 2,531,192 | Bergstrom | Nov. 21, 1950 |
| 2,560,604 | Shabaker | July 17, 1951 |
| 2,571,277 | Morrow | Oct. 16, 1951 |
| 2,635,864 | Goins | Apr. 21, 1953 |
| 2,717,863 | Evans | Sept. 13, 1955 |